United States Patent
Kleinwächter et al.

[11] Patent Number: 5,878,571
[45] Date of Patent: Mar. 9, 1999

[54] DEVICE FOR AMPLIFYING THE OUTPUT OF A DRIVEN MACHINE

[75] Inventors: Jürgen Kleinwächter; Hans Kleinwächter, both of Lörrach; Günther Rochelt, Hamburg, all of Germany

[73] Assignee: Bomin Solar Holding AG, Zug, Switzerland

[21] Appl. No.: 849,571

[22] PCT Filed: Dec. 6, 1995

[86] PCT No.: PCT/DE95/01731

§ 371 Date: Jun. 9, 1997

§ 102(e) Date: Jun. 9, 1997

[87] PCT Pub. No.: WO96/18029

PCT Pub. Date: Jun. 13, 1996

[30] Foreign Application Priority Data

Dec. 8, 1994 [CH] Switzerland ............... 3728/94

[51] Int. Cl.[6] ............................................. F01B 29/10
[52] U.S. Cl. ..................... 60/520; 60/508; 60/641.14
[58] Field of Search ............... 60/508, 517, 519, 60/520, 526, 641.14, 646

[56] References Cited

U.S. PATENT DOCUMENTS

| | | | |
|---|---|---|---|
| 3,484,616 | 12/1969 | Baumgardner et al. | 60/526 |
| 3,767,325 | 10/1973 | Schuman | 60/520 |
| 4,012,910 | 3/1977 | Schuman | 60/520 |
| 4,215,548 | 8/1980 | Beremand | 60/520 |
| 4,227,866 | 10/1980 | Stubbs . | |
| 4,414,814 | 11/1983 | White . | |
| 4,642,988 | 2/1987 | Benson | 60/641.14 |
| 4,776,171 | 10/1988 | Perry . | |
| 4,821,516 | 4/1989 | Isshiki | 60/641.14 |
| 5,406,801 | 4/1995 | Inoue et al. | 60/520 |

FOREIGN PATENT DOCUMENTS

| | | | |
|---|---|---|---|
| 2326203 | 12/1974 | Germany | 60/526 |
| 4109289 | 10/1991 | Germany . | |

*Primary Examiner*—Noah P. Kamen
*Attorney, Agent, or Firm*—Henry M. Feiereisen

[57] ABSTRACT

A device (1) has a drive (2) with a gas chamber 93), a plate (4) moveably disposed therein, a heater (5), a cooler (8) and a regenerator (11). An auxiliary drive (14) can move the plate (4) without driving the machine (13). The plate (4) may thus advantageously be moved with little force, and the device (1) may be modified in a simple manner to permit a automatic start of the device through exposure to the sun.

26 Claims, 4 Drawing Sheets

DEVICE FOR AMPLIFYING THE OUTPUT OF A DRIVEN MACHINE

BACKGROUND OF THE INVENTION

The invention relates to a device with a drive of a type having a gas chamber with a plate moveably disposed therein, a heater for heating the gas in the gas chamber, a cooler for cooling the gas in the gas chamber, and a regenerator for intermediate storage of heat of the gas. The present invention further refers to a method for operating a drive.

A device of this type is known from, for example, DE 41 09 289 A1. The pressure variations generated with such a device are mainly used for driving water pumps, mechanical pistons, refrigeration equipment and for generating electricity. Such device has the disadvantage that a crankshaft and, in particular, a heavy flywheel are required for starting the drive and keeping the drive in motion. Starting the device consequently requires large forces.

SUMMARY OF THE INVENTION

It is an object of the invention to design a device of this type which can be started easily.

This object is attained in accordance with the present invention by an auxiliary drive arranged in such a way as to be capable of moving the plate without driving the machine.

The invention is based on the understanding that on one hand, an auxiliary drive is required when the mechanical link between machine and drive is decoupled, but that, on the other hand, starting the machine becomes significantly easier as a result.

Since the device does not require a flywheel, a crankshaft or any other intermediate mechanical storage device, it can be made very light-weight. During the starting phase, only the plate has to be moved, and since the plate can be made with very little weight, the plate can be moved without having to overcome significant inertial forces.

By decoupling the machine from the auxiliary drive, the device can have various dynamic properties which are determined by the auxiliary drive and which can be varied over a wide range. Furthermore, it is possible to operate the machine with a cycle frequency which is different from the cycle frequency of the drive.

The construction of the entire device requires only a small number of wear-resistant components, and the entire device can be sealed against the environment.

In a preferred embodiment, the plate is permeable to gas and the regenerator is connected to the plate. This results in a very compact construction wherein the regenerator is located and protected inside the gas chamber.

For reducing, in this embodiment, the weight of the plate connected to the regenerator, it is advantageous if the cooler is located on a side opposite from the plate and is provided with a profile capable of being meshed with a corresponding profile of the plate. The meshing profiles provide good heat conduction from the cooler to the plate, since the air turbulence generated in the region of the profile improves the heat transfer.

In an alternate embodiment, the plate is essentially impervious to air and is preferably light-weight and heat-insulating, and the gas chamber has one opening on each side of the plate, wherein the opening is connected to the regenerator. Decoupling of the regenerator from the plate results in an additional weight reduction, thereby further reducing the force which has to be supplied by the auxiliary drive. Preferably, the plate is sealed with respect to the gas chamber when the plate is guided therein. It is, however, advantageous if the pressure loss in the regenerator is so small that the loss in the gap between the plate and the wall of the gas chamber can be neglected, thereby obviating the need for sealing means.

It is advantageous, if the cooler has a water surface disposed inside the gas chamber. This simplifies the construction of the device and provides very efficient cooling. The water surface can be a free water surface, but may also be covered by a membrane.

In order to keep the losses during heat transfer from the cooler to the plate as small as possible, it is advantageous if at least a portion of the cooler is connected to the plate.

In this case, the invention advantageously provides that the portion of the cooler connected to the plate comprises a surface, e.g. a filter, which can be wetted by water. This provides a good heat transfer, while at the same time keeping the design simple.

The heater is advantageously constructed to include an eccentric parabolic mirror section which can be rotated about an essentially vertical axis and a moveable funnel with an interior mirror surface. This mechanism concentrates the solar radiation and since in most cases only a small stationary concentration of the sunlight is required, the otherwise required seasonal adjustment of the elevation can be omitted by providing at the upper boundary of the drive a funnel with a suitable geometry which is mirror-coated on the inside.

In a most advantageous embodiment, the auxiliary drive comprises a converter for converting fluid pressure into a force, with the converter having a fluid inlet which is connected to the gas chamber by way of a control valve. With this embodiment, the device can be started automatically simply by employing a small portion of the pressure generated in the gas chamber during the heating phase to move the drive. Useful as a converter are, for example, a rigid cylinder-piston system, a closed unit with a flexible membrane or a bellow.

The control valve can be controlled electrically or mechanically. It is, however, advantageous if the control valve is connected to the converter by way of a loose coupling element. The length of the loose coupling corresponds to the difference between the amplitude of the drive and the valve travel of the control valve. It is hereby advantageous if springs or permanent magnet poles with identical poles which repel each other, enhance the direction reversal of the drive at the top and bottom dead center of the loose coupling element.

The loose coupling element represents a simple mechanical control wherein the shift points of the loose coupling element can be established by providing the converter with a dead center catch. The dead center catch can be, for example, a spring catch ensuring a clearly defined top and bottom dead center position of the converter, resulting in discontinuous oscillations of the drive which stays very briefly at its respective top and bottom dead center.

In the embodiment employing a converter, it is advantageous if between the gas chamber and the control valve there is disposed a preferably isobaric fluid reservoir with a check valve. The fluid reservoir makes it possible to store pressure during the expansion phases of the drive, with the pressure subsequently being used to operate the converter. The combination of fluid reservoir and check valve operates like a pneumatic rectifier.

It is advantageous if a throttle is provided between the gas chamber and the control valve. In this way, the system parameters can be manipulated manually or with the help of a computer or a sensor controlling the throttle.

Since fluid is withdrawn from the gas chamber for driving the converter, the fluid volume has to be replenished continuously. This can be accomplished through a suction relief valve which is disposed on the colder side of the drive and which opens when the pressure in the gas chamber is lower than the outside pressure. For constructing a sealed system, however, a preferred embodiment provides that the converter comprises a fluid outlet which is connected to the gas chamber via a low pressure reservoir.

It is advantageous if the machine is capable of being driven by the drive without a gear inserted therebetween. Here, the pressure variation generated in the drive is used to drive the machine directly, thereby eliminating losses resulting from friction and from the mass to be moved.

For implementing, for example, a hydraulic or a pneumatic drive, the machine comprises a working piston, and in the gas chamber there is provided a fluid surface connected to the working piston or to a gas chamber inside the working piston. Air or water pumps in particular can be efficiently driven in this manner, and the fluid surface can simultaneously serve as a cooler.

A particular embodiment provides that the machine comprises a preferably well insulated second gas chamber with a second plate moveably disposed therein, two heat exchangers, each heat exchanger located on one respective side of the plate, and a second regenerator. A machine of this type can be used as a refrigerating machine, since the pressure variation generated in the drive causes flow through the second regenerator.

The second plate can be moved directly with the auxiliary drive of the drive. In an advantageous embodiment, the machine comprises an auxiliary drive which is mechanically or pneumatically coupled to the auxiliary drive of the drive.

It is a further object of the present invention to provide a method for automatically starting the device.

This object is attained in accordance with the present invention by using a portion of the overpressure or underpressure generated by the expansion of compression of the gas for moving the plate.

The method solving the object of the invention enables the operation of the device of the invention in such a way that the device starts automatically as a result of the pressure variations generated in the drive. Decoupling the machine from the drive and diverting a portion of the pressure variation from the drive for the purpose of moving the auxiliary drive makes it possible for the first time, to start a hot gas (Stirling) machine without external excitation. This self-starting device has the additional advantage that it starts at exactly the point in time when drive energy is available.

In an advantageous embodiment, the gas withdrawn from the gas chamber during the expansion of the gas is blown off and the same amount of gas is taken up during compression. In this way, it is possible to ventilate a fluid during the operation of the device, wherein in many applications this fluid will be the same fluid which also used for cooling.

Since the greatest force is available during the expansion phase, it is advantageous if the machine is driven only during the expansion phase. During the compression phase, the entire force acting on the drive is thrown away in order to relieve the drive during this phase.

It is known that the Mac Mahon Gifford process represents the theoretically optimum process flow which, however, existing devices cannot even come close to. The known devices operate according to the Stirling process which is characterized by two isothermal and two isochoric changes of state. A balanced process flow, however, provides that a force applied to the machine is dimensioned and/or the valve is controlled in such a way that in the P-V diagram there is created a cycle with two isochores and two isobars.

For generating low temperatures, an advantageous method provides that a pressure variation which is generated in the gas chamber by moving the plate, is conveyed to a preferably well insulated second gas chamber with a second plate moveably disposed therein, and to two heat exchangers, each heat exchanger located on one respective side of the plate, and that high and low temperatures are generated in the two heat exchangers through a second regenerator. This refrigerating machine is essentially constructed like the drive and the aforedescribed advantageous features of the drive consequently apply equally to the refrigerating machine.

The second plate is advantageously moved phase-shifted with respect to the first plate. In this way, the inertia forces are ideally compensated, resulting in a much smoother operation of the device.

Whereas in similar devices the plates move predominantly translationally, the movement of the plates in the device of the invention can also be a rotational or a rocking motion. A rotational motion inside the gas chamber reduces the forces due to acceleration and is of particular importance for heavy plates, whereas a rocking motion is advantageous when several drives are employed or for operating the abovedescribed refrigerating machine. This drive has the particular advantage that the same force is generated with each stroke, which contributes to the smooth operation of the driven machine.

BRIEF DESCRIPTION OF THE DRAWING

Several embodiments are depicted in the drawings and will be described in greater detail hereinafter. It is shown in.

DETAILED DESCRIPTION OF PREFERRED EMBODIMENTS

Figure 1:
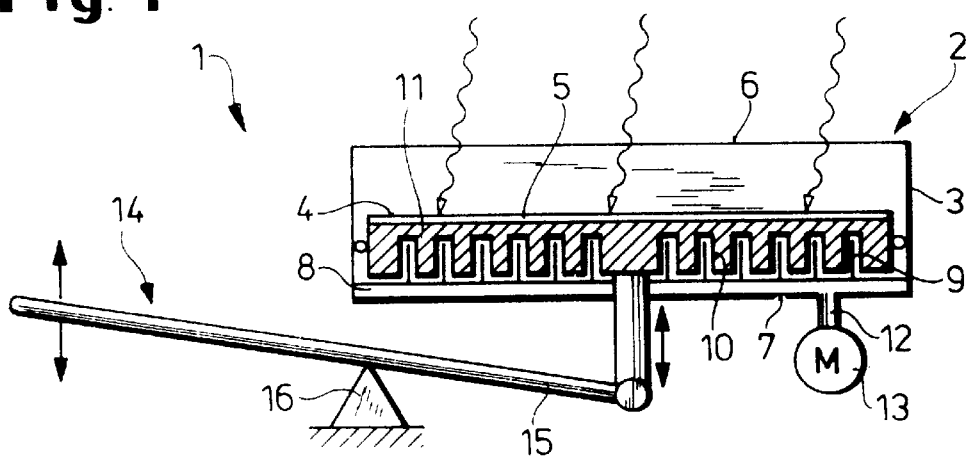
FIG. 1 a device with a manual auxiliary drive and a regenerator disposed on the plate.

The device 1 depicted in FIG. 1 comprises a drive 2 composed of a parallelepiped-shaped gas chamber 3 in which a plate 4 which is permeable to gas, can move up and down. The plate 4 has a black top side functioning as a heater 5 since the top side 6 of the cube-shaped gas chamber 3 is transparent to light. On the bottom side 7 of the gas chamber 3, there is disposed a cooler 8, with the top side of the cooler provided with profile 9 of vertical ribs wherein the profile 9 cooperates with a like profile 10 of indentations in the plate 4. Between the profile 10 and the top side of the plate, there is located a regenerator 11 capable of providing intermediate storage for heat, through which regenerator 11 gas can flow when the plate 4 moves. In addition, the gas chamber 3 is provided with an opening 12 for transmitting pressure variations to a machine 13 and thereby driving the machine 13. In the present case, an auxiliary drive 14 for moving the plate 4 up and down is formed by a lever rod 15 supported by a bearing 16.

During the operation of device 1, the plate 4 moves up and down with the help of the lever rod 15. Since the plate 4 is permeable to gas, no pressure variation is generated. However, when the plate 4 is in its bottom position, the radiation which is converted into heat at the black surface of the plate, heats the gas in the gas chamber 3, thereby creating an overpressure.

If, on the other hand, the plate 4 moves upwardly, then the gas is below the plate 4 and cooled by the cooler 8. In this manner, an underpressure is created.

When the plate moves upwardly and gas flows through the plate 4, the heat from the gas is absorbed by the regenerator 11, while heat is transferred from the regenerator 11 back to the gas when the plate moves downwardly. In addition, turbulence is generated when the profiles 9 and 10 from the plate 4 and the cooler 8, respectively, mesh, thereby further promoting heat transfer from the cooler 8 to the gas.

Consequently, only the plate 4 is moved up and down by the auxiliary drive 14, whereas many times the energy which is consumed by the auxiliary drive 14, is generated by the thermodynamic process in form of pressure variation energy.

Figure 2:
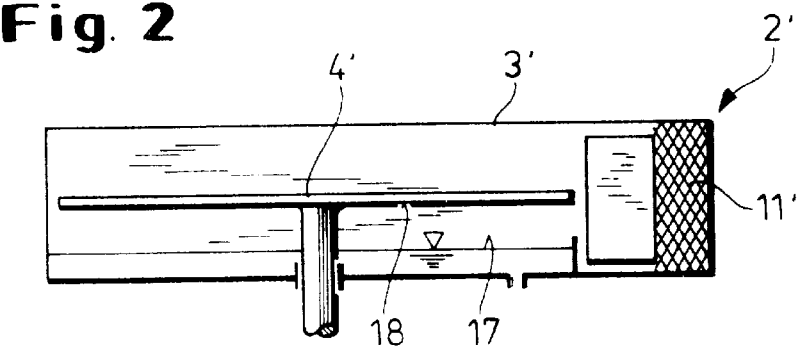
FIG. 2 schematically a part of the device of FIG. 1 with the regenerator disposed on the outside.

Referring now to FIG. 2, there is shown an alternate embodiment 2' of the drive 2 wherein the regenerator 11' is located outside the gas chamber 3'. In this case, the plate 4' is impermeable to gas, is light-weight and heat-insulating; when the plate 4' moves downwardly, the gas is pushed to the regenerator 11' through a bottom opening and returned to the gas chamber 3' through a top opening. This process is reversed when the plate 4' is lifted upwardly. Here, the velocity of the plate 4' is small and the regenerator 11' is highly permeable to gas, so that the plate 4' does not have to be sealed with respect to the gas chamber 3'.

In addition, in the drive 2' there is provided a water surface 17 as a cooler 8, wherein the underside 18 of the plate forms a surface capable of being wetted by water and acting as a cooler.

Figure 3:
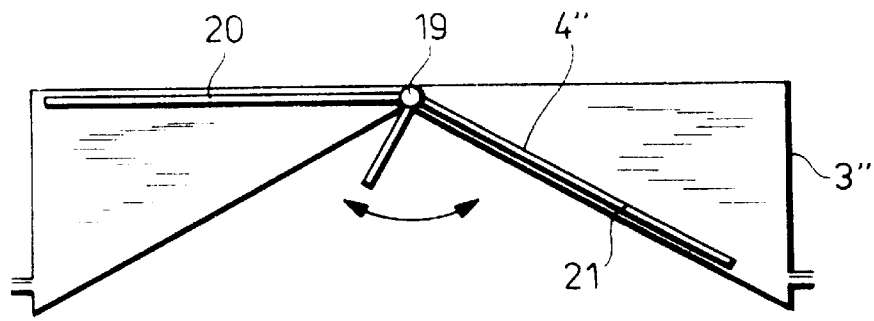
FIG. 3 schematically a part of the device with a V-shaped plate.

In FIG. 3, there is depicted another embodiment of the drive. In this embodiment, there is provided a V-shaped plate 4" which is pivotally supported at its center by a pivot bearing 19 in such a way that one side 20 of the plate 4" is positioned at the top side of a gas chamber $3a$" while the other side 21 of the plate 4" is positioned at the bottom side of another gas chamber $3b$"—and vice versa. In this way, the gas is always cooled on one side while the gas is heated on the other side. This makes possible a smoother operation of a machine 13.

Figure 4:
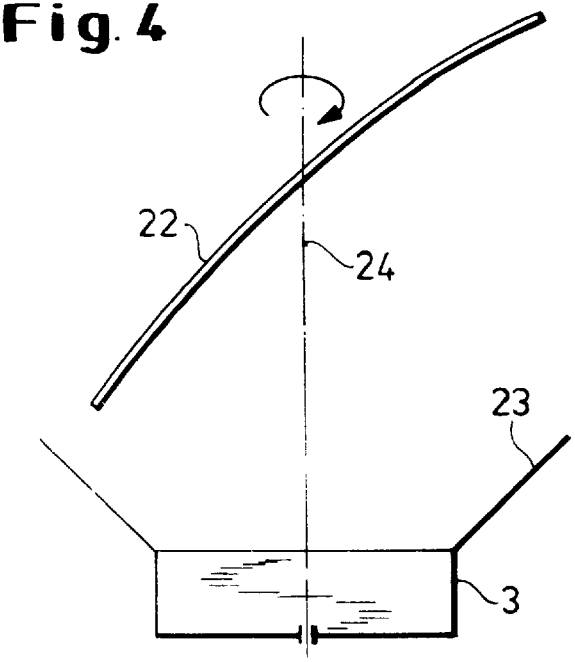
FIG. 4 schematically a part of the device adapted for focusing of the radiation.

Referring now to FIG. 4, there is shown schematically how a gas chamber 3 is heated by a rotatable eccentric parabolic mirror section 22 and a moveable funnel 23 which is mirror-coated on the inside. The gas chamber 3 is mounted in such a way that it center axis is pointing to the star Polaris. The parabolic mirror represents an eccentric section of a full paraboloid and rotates with a constant angular velocity of 15(/h about the polar axis, as described, for example, in DE 33 44 195 A1. Since in the present case only a relatively small concentration is required, a funnel 23 is provided at the upper boundary of the gas chamber 3.

Figure 5:
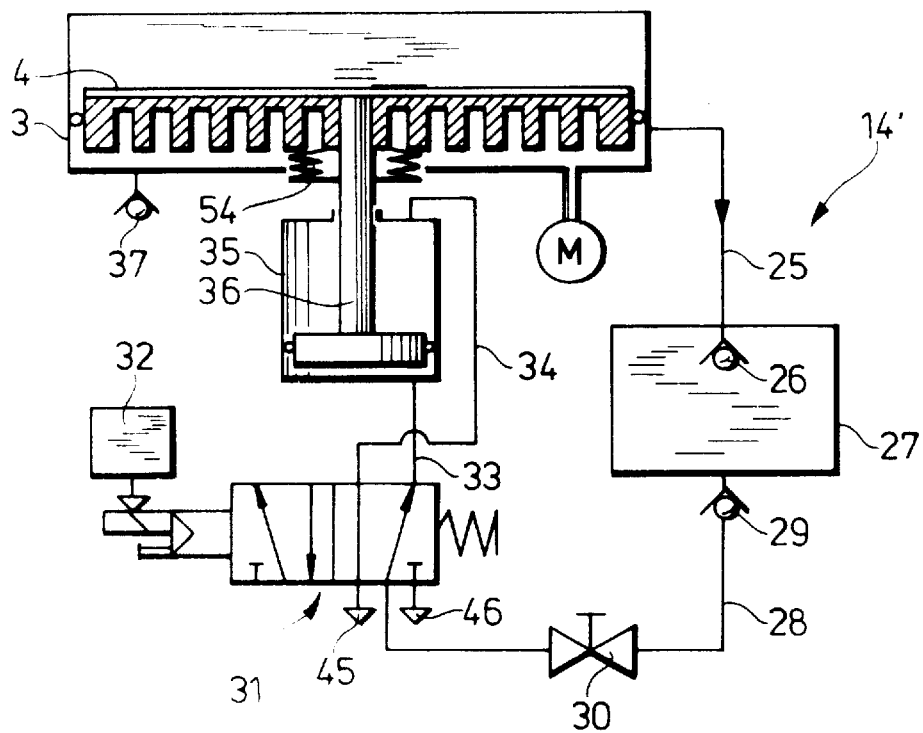
FIG. 5 schematically a device with a photovoltaically controlled control valve.

In FIG. 5, there is shown an alternate auxiliary drive 14' for moving a plate 4 up and down. This auxiliary drive 14' has a conduit 25 extending through a first check valve 26 to an intermediate reservoir 27. Another conduit 28 extends through a second check valve 29 and a throttle 30 to a control valve 31 which can be driven back and forth continuously by a photovoltaic plate 32. On the other side of the check valve, there are located two conduits 33 and 34, with each of the conduits connected to one respective side of a piston-cylinder unit 35. The piston-cylinder unit 35 is provided with a piston 36 for moving the plate 4. Since gas is withdrawn from the gas chamber through conduit 25, the bottom side of the gas chamber 3 is provided with a sniffing valve 37 for taking in gas during the compression phase.

During the operation of drive 14', a small gas flow is withdrawn from the gas chamber 3 during the expansion phase and conveyed to the reservoir 26. The overpressure building up in the reservoir 26 is throttled and is alternately applied to one side or to the other side of the piston-cylinder unit 35 for moving the plate 4 up and down.

Figure 6:
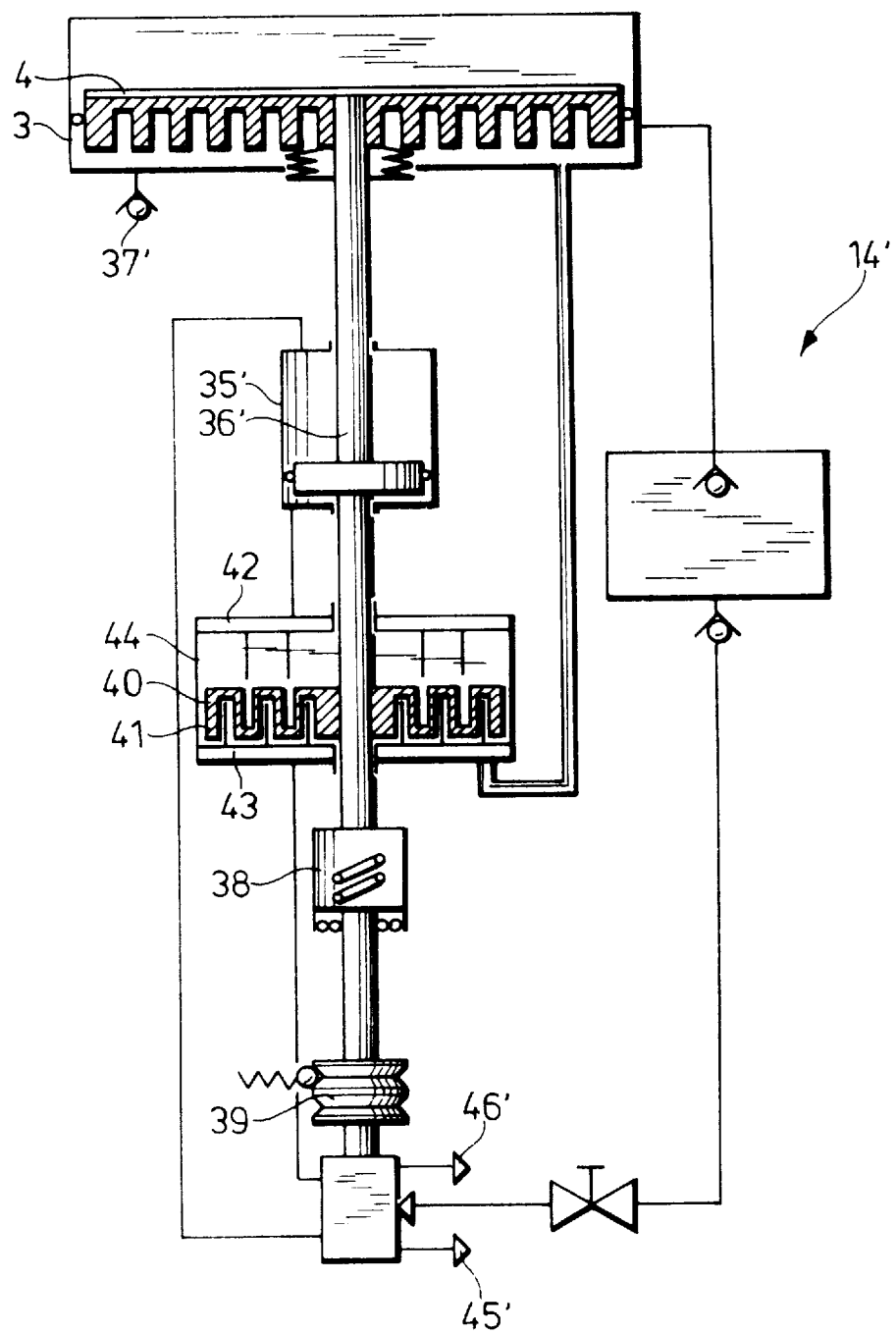
FIG. 6 schematically a device with a loose coupling element.

In FIG. 6, there is depicted another alternate drive 14" wherein the driven machine 13' is a refrigerating machine. The design of this machine corresponds essentially to the drive depicted in FIG. 5. In this case, however, the piston 36' of the piston-cylinder unit 35' is connected to the control valve 31' through a loose coupling element 38 and a dead center catch 39. Furthermore, the extension of the piston 36' supports a second plate 40 which can be moved back and forth with a second regenerator 41 between two heat exchangers 42 and 43 in a second gas chamber 44.

Consequently, both plates 4 and 40 are moved by only one drive 14' in synchronism, but phase-shifted, with respect to each other, with the movement of the pistons controlling the controller.

In another variation which is not shown here, the outlets 45 and 46, and 45' and 46', respectively, are connected to the sniffing valve 37 and 37', respectively, via a low pressure reservoir. In this way, a closed system is attained.

Figure 7:
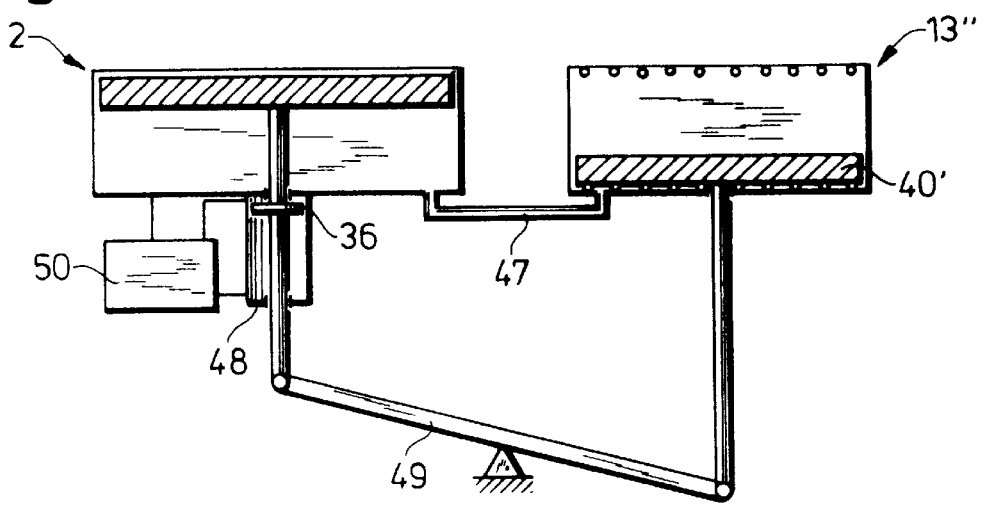
FIG. 7 schematically a device with a refrigerating machine and rigid coupling of the auxiliary drives.

In FIG. 7, there is shown a modification of the device of the invention wherein the drive 2 is connected to a refrigerating machine 13" by a connecting conduit 47. The auxiliary drive 48 of drive 2 is connected to the plate 40' of the refrigerating machine 13" via a beam balance 49. Herein, the auxiliary drive 48 is supplied from the drive 2 with compressed air which flows into an isobaric reservoir provided with a control valve 40 and is applied alternately to the top side and the bottom side of piston 36 of the auxiliary drive 48.

The beam balance 49 provides a rigid connection between the drive 2 and the machine 13", with the pistons of the machine 13" movable in relation to each other with a fixed phase shift.

Figure 8:
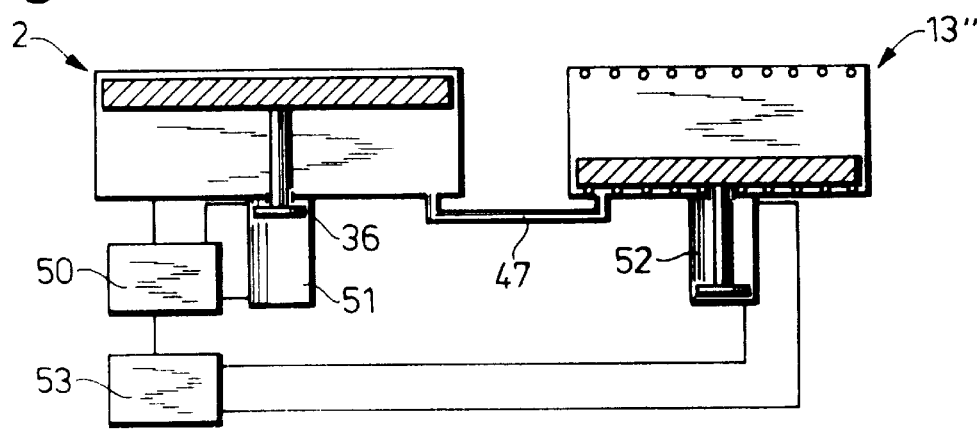
FIG. 8 schematically a device with a refrigerating machine and flexible coupling of the auxiliary drives.
Figure 9:
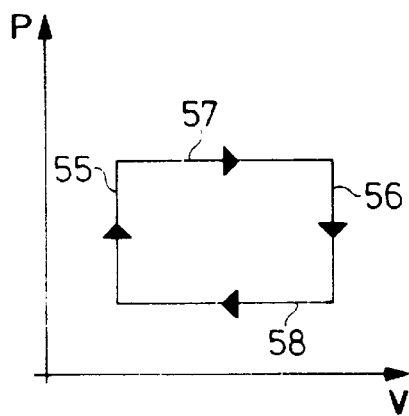
FIG. 9 a P-V diagram with the Mac Mahon Gifford process.

In FIG. 8, there is shown a flexible coupling between drive 2 and the refrigerating machine 13", which are also connected to each other by a connecting conduit 47, with the drive 2 and the refrigerating machine 13" each having their own auxiliary drive 51 and 52, respectively. This device also includes an isobaric reservoir with a control valve 50 for alternately supplying compressed air to the piston 36 in the auxiliary drive 51. However, a portion of the compressed air flows into a phase shifter 53 which supplies compressed air to the auxiliary drive 52 of the refrigerating machine 13".

Using two auxiliary drives 51 and 52 in conjunction with the phase shifter 53 makes it possible to operate the auxiliary drives with an arbitrary phase shift therebetween and to change that phase shift even when the device is operating.

During the operation of a device 1 according to the invention, as illustrated in FIG. 1, the plate is located due to its weight at the bottom dead center, with gas, such as for example air, contained in the gas chamber 3. The gas is heated by the radiation energy impinging through the transparent top side 6 onto the black top surface of the plate 4 where the radiation is converted into heat. As a result, the gas expands and presses onto the machine via the opening 12.

Subsequently, the plate 4 is moved upwardly by way of the lever rod 15 supported by the bearing 16, whereby the gas flows through the regenerator 11 located on the bottom surface of the plate, where the gas is cooled down. In the cooled state, the gas volume is reduced, thereby creating an underpressure acting on the machine 13 by way of the opening 12. This underpressure is used alternately with the overpressure to drive the machine. While the plate of larger devices can also be moved up and down rather easily, large pressure variations can be generated with a device of this type for driving even larger machines which cannot be driven manually.

When a gas chamber 3' according to FIG. 2 is employed, gas is pushed through the regenerator 11' which in this embodiment is located outside the gas chamber 3', with the help of the plate 4'.

When a device is operated according to FIG. 3, the V-shaped plate 21 is moved back and forth about the pivot bearing 19, causing an overpressure on one side and an underpressure on the other side. The variation in air pressure obtained in this manner is particularly advantageous for driving machines which operate under constant load.

When a device is operated according to FIG. 4, the parabolic mirror section 22 is rotated by 15(per second about its vertical axis 24 for the purpose of concentrating a large amount of solar radiation onto the top side of the gas chamber 3.

The device of FIG. 5 starts automatically, since a portion of the overpressure generated during the expansion of the gas is used for moving the plate. For this purpose, a portion of the overpressure is conveyed to the intermediate reservoir 27 during the expansion phase, i.e. when the plate is located in the bottom region of the gas chamber 3. This overpressure is gradually reduced by alternately conveying compressed air to the top side and the bottom side of a piston 36 through a control valve 31 which moves back and forth. This piston 36 is connected to the plate 4 and moves the plate 4 alternately up and down.

If sufficient solar radiation is available, the gas in the gas chamber 3 is, on one hand, heated, filling the intermediate reservoir 27, while on the other hand, the photovoltaic plate 32 supplies sufficient electrical current for moving the control valve 31 back and forth.

The compressed air required for moving the plate is withdrawn from the gas chamber and is taken in again on the cool side of the plate through the sniffing valve 37 during the compression phase.

It is, on one hand, the intent to keep the weight of the plate 4 as light as possible; on the other hand, however, the weight of the plate in the depicted device is received by a spring 54 with an almost constant characteristic force curve.

Depending on the driven machine, it may be advantageous to use for driving the machine only the overpressure generated during the expansion in the gas chamber 3.

The force applied to the machine and the control of valve 31 are controlled in such a way that the cycle in the P-V diagram depicted in FIG. 6 is created, having two isochores 55, 56 and two isobars 57, 58.

During the operation of the device of FIG. 6, the control valve is not electrically actuated, as was the case in FIG. 5, but mechanically actuated. In addition, for generating low temperatures, a second plate 40 moves in synchronism with the plate 4, since both plates are rigidly connected with each other.

The functionality of the devices depicted in FIGS. 7 and 8 follows from the description of the devices and the information provided in the foregoing.

We claim:

1. A device for amplifying the output power of a machine, comprising:
   a gas chamber and a plate which is moveable within said gas chamber,
   a heater for heating a gas in said gas chamber in response to a first position of the plate and creating an overpressure,
   a cooler for cooling the gas in said gas chamber in response to a second position of the plate and creating an underpressure,
   a regenerator for storing heat energy of the gas, and an auxiliary drive capable of moving the plate without driving the machine, wherein the overpressure and the underpressure drive the machine in response to the position of the plate.

2. The device according to claim 1, wherein the plate is permeable to the gas and the regenerator is connected to the plate.

3. The device according to claim 2, wherein the cooler is located on a side opposite from the plate and comprises a profile capable of meshing with a corresponding profile disposed on the plate.

4. The device according to claim 2, wherein the auxiliary drive further comprises:
   a cylinder unit with a fluid inlet which is connected to the gas chamber via a control valve, and a movable piston which converts a fluid pressure into a force capable of moving the plate.

5. The device according to claim 4, wherein the control valve (31') is connected to the converter (35) by way of a loose coupling element (38).

6. The device according to claim 4 wherein the converter (35) comprises a dead center catch (39).

7. The device according to claim 4, and further comprising an isobaric fluid reservoir with a check valve located between the gas chamber and the control valve.

8. The device according to claim 4, and further comprising a throttle valve arranged between the gas chamber and the control valve.

9. The device according to claim 4, wherein the cylinder unit comprises a fluid outlet which is connected to the gas chamber by way of a low pressure reservoir.

10. The device according to claim 1, wherein the plate (4) is essentially impervious to air and is preferably light-weight and heat-insulating, and that on each side of the plate (4') the gas chamber (3') has one opening which is connected to the regenerator (11').

11. The device according to claim 1 wherein the cooler (8) has a water surface (17) disposed inside the gas chamber.

12. The device according to claim 1 wherein at least a portion of the cooler (8) is connected to the plate (4').

13. The device according to claim 12, wherein the portion of the cooler (8) connected to the plate (4) comprises a surface which can be wetted by water.

14. The device according to claim 1 wherein the heater (5) comprises an eccentric parabolic mirror section (12) which can be rotated about an essentially vertical axis (24), and a moveable funnel (23) with an interior mirror surface.

15. The device according to claim 1, wherein the machine is controlled by the auxiliary drive without a mechanical linkage between the machine and the auxiliary drive.

16. The device according to claim 1, wherein the machine further comprises a working piston and wherein a fluid is in contact with said cooler inside the gas chamber and connects the gas chamber to the working piston.

17. The device according to claim 1 wherein the machine (13) comprises a preferably well insulated second gas chamber (44) with a second plate (40) moveably disposed therein, two heat exchangers (42, 43), each heat exchanger (42, 43) located on one respective side of the plate (40), and a second regenerator (41).

18. The device according to claim 17, wherein the machine (13) comprises a second auxiliary drive (52) which is mechanically or pneumatically coupled to the auxiliary drive of the drive.

19. A method for driving a device of a type having a gas chamber filled with a gas and a plate which can move inside the gas chamber between a heater and a cooler in response to movement of an auxiliary drive, to amplify the output power of a machine, said method comprising the steps of:

moving with said auxiliary drive said plate inside the gas chamber to a first position so as to heat the gas and create an overpressure;

moving with said auxiliary drive said plate inside the gas chamber to a second position so as to cool the gas and create an underpressure;

wherein at least a portion of the overpressure or underpressure is used to move said auxiliary drive.

20. The method according to claim 19, wherein a quantity of gas is vented from the gas chamber during overpressure and the same quantity of gas is drawn in during underpressure.

21. The method according to claim 20, wherein a force produced by the underpressure and overpressure and applied to the machine is controlled so as to produce a machine cycle with two isochores and two isobars.

22. The method according to claim 20 wherein a pressure variation which is generated in the gas chamber (3) by moving the plate (4), is conveyed to a preferably well insulated second gas chamber (44) with a second plate (40) moveably disposed therein, and to two heat exchangers (42, 43), each heat exchanger (42, 43) located on one respective side of the plate (40), and that high and low temperatures are generated in the two heat exchangers (42, 43) through a second regenerator (41).

23. The method according to claim 22, wherein the second plate (40) is moved phase-shifted with respect to the first plate (4).

24. The method according to claim 20 wherein the movement of the plates (4, 4', 4", 40) inside the chambers is a translation, a rotation or a rocking motion.

25. The method according to claim 20, wherein said overpressure and underpressure is throttled with a throttle valve and controlled so as to produce a machine cycle with two isochores and two isobars.

26. The method according to claim 19, wherein the machine is driven only under overpressure.

* * * * *